(12) United States Patent
He et al.

(10) Patent No.: US 10,599,275 B2
(45) Date of Patent: Mar. 24, 2020

(54) TOUCH STRUCTURE HAVING RING-SHAPED AND BLOCK-SHAPED ELECTRODES AND TOUCH PANEL USING THE SAME

(71) Applicants: Au Optronics (Suzhou) Corp., Ltd., Suzhou (CN); Au Optronics Corporation, Hsin-Chu (TW)

(72) Inventors: Su-Feng He, Suzhou (CN); Han-Min Zhang, Suzhou (CN)

(73) Assignees: AU OPTRONICS (SUZHOU) CORP. LTD., Suzhou (CN); AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 16/110,554

(22) Filed: Aug. 23, 2018

(65) Prior Publication Data

US 2019/0064967 A1 Feb. 28, 2019

(30) Foreign Application Priority Data

Aug. 23, 2017 (CN) .......................... 2017 1 0729508

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01); *G06F 2203/04111* (2013.01)

(58) Field of Classification Search
None
See application file for complete search history.

(56) References Cited

U.S. PATENT DOCUMENTS

| | | | | |
|---|---|---|---|---|
| 7,910,843 B2 * | 3/2011 | Rothkopf | ............ | G06F 3/03547 200/4 |
| 7,932,897 B2 * | 4/2011 | Elias | ....................... | G06F 3/044 345/174 |
| 8,416,198 B2 * | 4/2013 | Rathnam | ............. | G06F 3/03547 345/156 |

(Continued)

FOREIGN PATENT DOCUMENTS

| CN | 204360355 U | 5/2015 |
|---|---|---|
| CN | 105242814 A | 1/2016 |

*Primary Examiner* — David D Davis
(74) *Attorney, Agent, or Firm* — Tim Tingkang Xia, Esq.; Locke Lord LLP (57) ABSTRACT

A touch structure includes a first touch electrode and a second touch electrode. The first touch electrode includes multiple ring-shaped electrodes, which are concentrically arranged around a center. The second touch electrode is electrically insulated from the first touch electrode, and includes multiple first block-shaped electrode and multiple second block-shaped electrodes. An area of each of the first block-shaped electrodes is A1, an area of each of the second block-shaped electrodes is A2, and A1≠A2. The first block-shaped electrodes are arranged from the center toward a direction away from the center and are electrically connected to each other to form a first electrode string. The second block-shaped electrodes are arranged from the center toward a direction away from the center and are electrically connected to each other to form a second electrode string. The first electrode string and the second electrode string are electrically connected.

18 Claims, 5 Drawing Sheets

(56) References Cited

U.S. PATENT DOCUMENTS

| | | | |
|---|---|---|---|
| 8,514,185 B2* | 8/2013 | Hotelling | G06F 3/044 345/156 |
| 8,872,771 B2* | 10/2014 | Hotelling | G06F 3/044 178/18.01 |
| 9,454,256 B2* | 9/2016 | Fisher | G06F 1/1626 |
| 2008/0007539 A1* | 1/2008 | Hotelling | G06F 3/044 345/173 |
| 2009/0273573 A1 | 11/2009 | Hotelling | |
| 2010/0301879 A1* | 12/2010 | Philipp | G06F 3/03547 324/679 |
| 2011/0248954 A1* | 10/2011 | Hamada | G06F 3/03547 345/174 |
| 2013/0346008 A1* | 12/2013 | Bulea | G06F 3/0418 702/85 |
| 2014/0062938 A1* | 3/2014 | Bulea | G06F 3/0418 345/174 |
| 2014/0085249 A1* | 3/2014 | Vandermeijden | G06F 3/0418 345/174 |
| 2017/0235395 A1* | 8/2017 | Long | G02F 1/13338 345/174 |
| 2018/0329566 A1* | 11/2018 | Wei | G06F 3/044 |

* cited by examiner

TOUCH STRUCTURE HAVING RING-SHAPED AND BLOCK-SHAPED ELECTRODES AND TOUCH PANEL USING THE SAME

CROSS-REFERENCE TO RELATED PATENT APPLICATION

This non-provisional application claims priority to and the benefit of, pursuant to 35 U.S.C. § 119(a), patent application Serial No. 201710729508.9 filed in P.R. China on Aug. 23, 2017. The disclosure of the above application is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The present invention relates to a touch structure and a touch panel using the same.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Recently, light and slim flat panel displays have been widely applied to various electronic products, and to achieve objectives of usage convenience, concise appearance, and multifunction, many information products have been changed from using a conventional input device, such as a keyboard or a mouse, to using a touch panel as an input device. An operating principle of a touch panel is that when a conducting object gets in contact with the touch panel, an electrical property of a touch unit in the touch panel changes. Such a change in the electrical property is converted into a control signal, the control signal is transmitted to an external touch chip or a control circuit, and a processor performs data processing on the control signal to calculate a position of the conducting object. Regarding this, how to further improve a structure of a touch panel has been a hot issue in related fields at present.

SUMMARY

An implementation of the present invention provides a touch structure, including a first touch electrode and a second touch electrode. The first touch electrode is disposed on a substrate and includes a plurality of ring-shaped electrodes, where the ring-shaped electrodes are concentrically arranged around a center. The second touch electrode is disposed on the substrate and is electrically insulated from the first touch electrode, where the second touch electrode includes a plurality of first block-shaped electrode and a plurality of second block-shaped electrodes, an area of each of the first block-shaped electrodes is A1, an area of each of the second block-shaped electrodes is A2, and A1≠A2, where the first block-shaped electrodes are arranged from the center toward a direction away from the center and are electrically connected to each other, so as to form a first electrode string, the second block-shaped electrodes are arranged from the center toward a direction away from the center and are electrically connected to each other, so as to form a second electrode string, and the first electrode string and the second electrode string are electrically connected.

An implementation of the present invention provides a touch structure, including a first touch electrode and a second touch electrode. The first touch electrode is disposed on a substrate and includes a plurality of ring-shaped electrodes, where the ring-shaped electrodes share a center and are radially spread from the center. The second touch electrode is disposed on the substrate and is electrically insulated from the first touch electrode, where the second touch electrode includes a plurality of first block-shaped electrodes and a plurality of second block-shaped electrodes, an area of each of the first block-shaped electrodes is A1, an area of each of the second block-shaped electrodes is A2, and A1≠A2, where the first block-shaped electrodes are grouped into a first group and a second group, the second block-shaped electrodes are grouped into a third group and a fourth group, the first block-shaped electrodes belonging to the first group and the second block-shaped electrodes belonging to the third group are arranged in a staggered manner from the center toward a direction away from the center and are electrically connected to each other, so as to form a first electrode string, and the first electrode string uses one of the second block-shaped electrodes belonging to the third group as a starting point for arrangement from the center, and the first block-shaped electrodes belonging to the second group and the second block-shaped electrodes belonging to the fourth group are arranged in a staggered manner from the center toward a direction away from the center and are electrically connected to each other, so as to form a second electrode string, and the second electrode string uses one of the first block-shaped electrodes belonging to the second group as a starting point for arrangement from the center, where the first electrode string and the second electrode string are electrically connected.

An implementation of the present invention provides a touch panel, including a substrate, a touch structure, a control unit, and a plurality of wires. The substrate is distinguished into a first region and a second region that are connected to each other, and an area of the first region is larger than an area of the second region. The touch structure is disposed on the first region and the second region of the substrate. The control unit is disposed on the first region of the substrate. The plurality of wires is disposed on the substrate and is configured to electrically connect the second touch electrodes of the touch structure and the control unit, where vertical projections of the wires on the substrate are located inside the first region.

These and other aspects of the present disclosure will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein.

DETAILED DESCRIPTION

A plurality of implementations of the present invention is disclosed below by using drawings, and to clarify the description, many details in practice are described together in the following description. However, it should be understood that the details in practice should not be used to limit the present invention. That is, in some implementations of the present invention, the details in practice are not necessary. In addition, to simplify the drawings, some conventional structures and components are shown simply and schematically in the drawings.

Figure 1A:
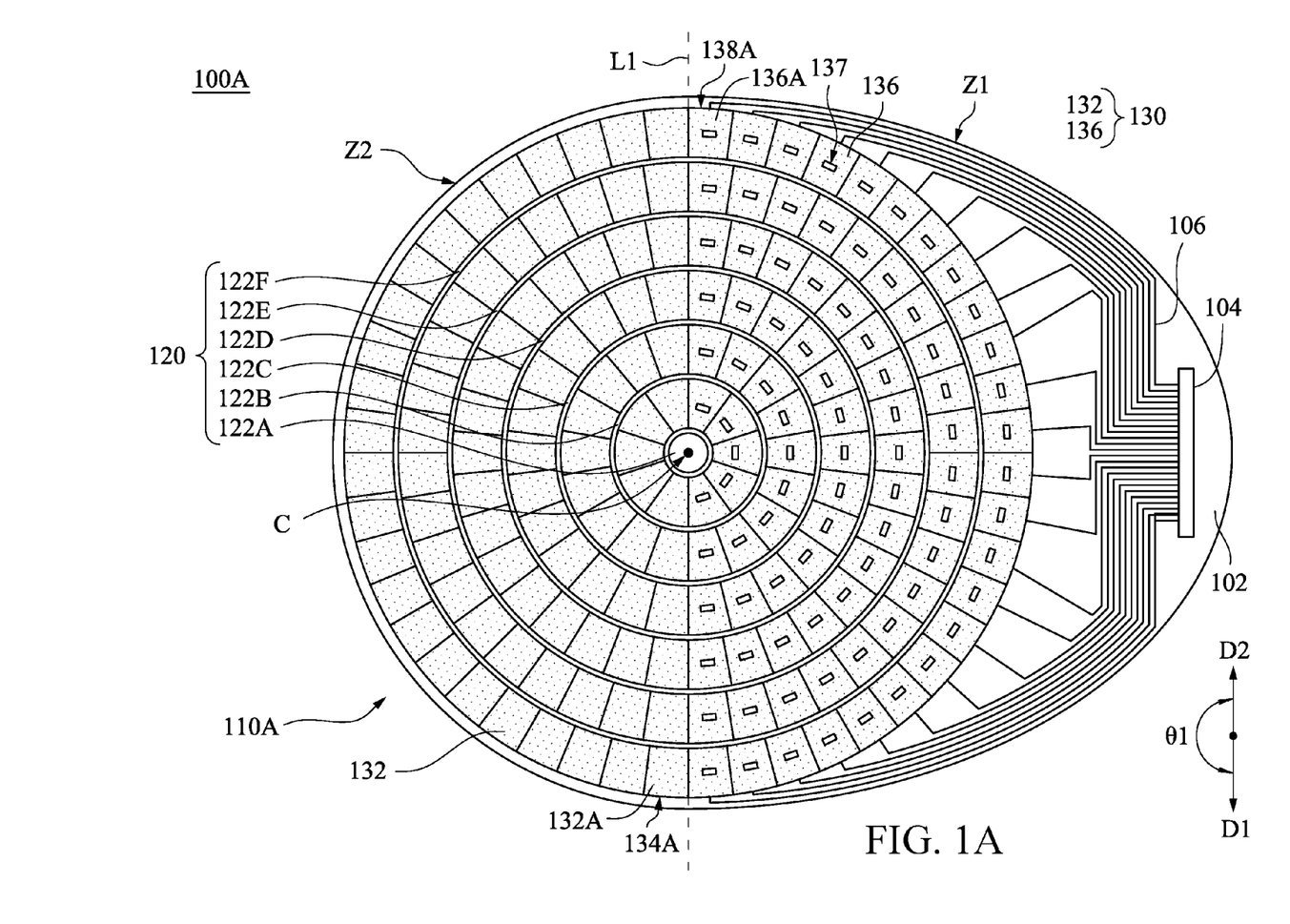
FIG. 1A is a top view of a touch panel according to a first implementation of the present invention.

Referring to FIG. 1A, FIG. 1A is a top view of a touch panel 100A according to a first implementation of the present invention. The touch panel 100A includes a substrate 102, a control unit 104, a plurality of wires 106, and a touch structure 110A. The substrate 102 is distinguished into a first region Z1 and a second region Z2 that are connected to each other, and an area of the first region Z1 is larger than an area of the second region Z2. The control unit 104 and the plurality of wires 106 are disposed on the substrate 102, and vertical projections of the control unit 104 and the plurality of wires 106 on the substrate 102 are located inside the first region Z1. The touch structure 110A is disposed on the substrate 102, and a vertical projection of the touch structure 110A on the substrate 102 is located in the first region Z1 and the second region Z2. The touch structure 110A includes a first touch electrode 120 and a second touch electrode 130.

The first touch electrode 120 is disposed on the substrate 102 and includes a plurality of ring-shaped electrodes 122A to 122F. Although the ring-shaped electrode 122A in this implementation is shown as a solid one, in other implementations, the ring-shaped electrode 122A may alternatively be hollow. The plurality of ring-shaped electrodes 122A to 122F share a center C, and the ring-shaped electrodes 122A to 122F are concentrically arranged around the center C. That is, the ring-shaped electrodes 122A to 122F are radially spread outward from the center C, and gradually become larger, and in some implementations, the ring-shaped electrodes 122A to 122F are arranged equidistantly from the center C toward a direction away from the center C.

The second touch electrode 130 is disposed on the substrate 102 and is electrically insulated from the first touch electrode 120. The second touch electrode 130 includes a plurality of first block-shaped electrodes 132 and a plurality of second block-shaped electrodes 136, and a quantity of the first block-shaped electrodes 132 and a quantity of the second block-shaped electrodes 136 are the same. The first block-shaped electrodes 132 and the second block-shaped electrodes 136 may be arranged radially outward from the center, and the first block-shaped electrodes 132 and the second block-shaped electrodes 136 may form a plurality of ring-shaped patterns sharing the center C. Specifically, the first block-shaped electrodes 132 and the second block-shaped electrodes 136 in FIG. 1A may be arranged into six ring-shaped patterns sharing the center C. In addition, the first block-shaped electrodes 132 and the second block-shaped electrodes 136 respectively occupy halves of the second touch electrodes 130. For example, in FIG. 1A, the second touch electrode 130 is divided by a dashed line L1 into two equal regions. The first block-shaped electrode 132 and the second block-shaped electrode 136 are respectively located inside the two regions.

In each ring-shaped pattern, shapes and contours of the first block-shaped electrode 132 and the second block-shaped electrode 136 are the same. For example, between adjacent ring-shaped electrodes 122B and 122C, the first block-shaped electrode 132 and the second block-shaped electrode 136 have the same shape and contour. Herein, the "same counter" means that when the touch panel 100A is viewed from a top view perspective, the viewed contours are the same. That is, an area defined by a counter of a vertical projection of each first block-shaped electrode 132 on the substrate 102 and an area defined by a contour of a vertical projection of each second block-shaped electrode 136 on the substrate 102 are substantially the same. In addition, in this implementation, drawn shapes of the first block-shaped electrode 132 and second block-shaped electrode 136 are trapezoid-like. However, in other implementations, shapes of the first block-shaped electrode 132 and the second block-shaped electrode 136 may alternatively be rectangles, diamonds, triangles, or sectors.

Figure 1B:
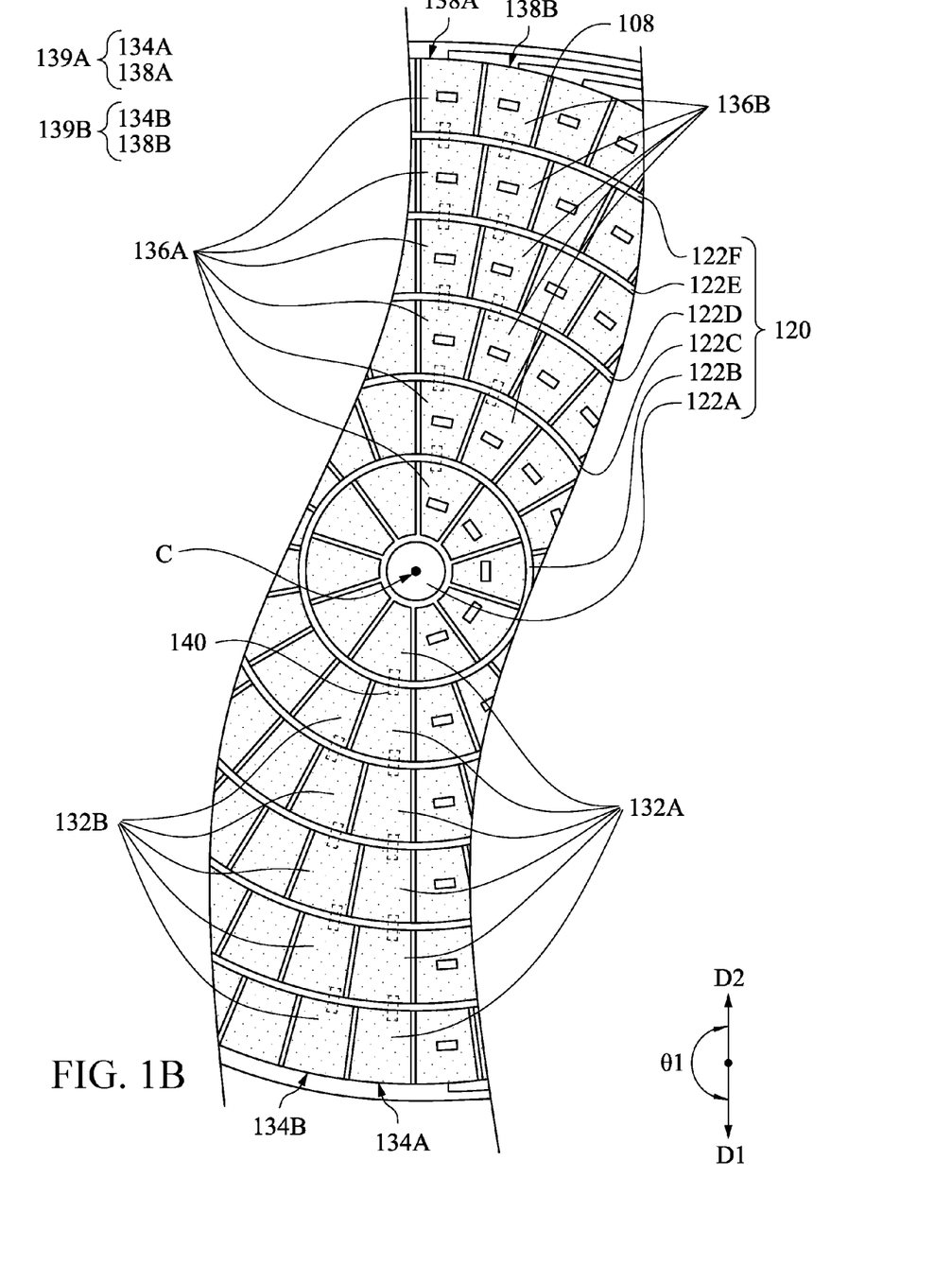
FIG. 1B is a top view of some block-shaped electrodes of the touch panel in FIG. 1A.

The first block-shaped electrodes 132 and the second block-shaped electrodes 136 may respectively form a plurality of electrode strings. Specifically, referring to FIG. 1B, FIG. 1B is a top view of some block-shaped electrodes of the touch panel in FIG. 1A. As shown in FIG. 1B, in each ring-shaped pattern, adjacent first block-shaped electrodes 132 and adjacent second block-shaped electrodes 136 are electrically insulated from each other by means of isolation portions 108.

First block-shaped electrodes 132A that are arranged from the center C toward a direction away from the center C and the ring-shaped electrodes 122A to 122F of the first touch electrode 120 are arranged in a staggered manner, and the first block-shaped electrodes 132A may be electrically connected to each other through bridge electrodes 140, so as to form a first electrode string 134A. In addition, in the first electrode string 134A, there is only one first block-shaped electrode 132A between adjacent two of the ring-shaped electrodes 122A to 122F. Likewise, the first block-shaped electrodes 132B that are arranged from the center C toward a direction away from the center C are also electrically connected to each other through bridge electrodes 140 to form another first electrode string 134B. Details are not described herein again. By means of the disposed isolation portions 108, the first electrode strings 134A and 134B are electrically isolated from each other. In addition, to prevent the drawing from being excessively complex, FIG. 1B only shows some of the bridge electrodes 140, which is clearly stated first. Besides, the block-shaped electrodes form an electrical connection in a one-to-one succession manner from the center C toward a direction away from the center C. For example, the block-shaped electrodes 132A in the ring-shaped electrode 122A are merely electrically connected to the block-shaped electrode 132A between the ring-shaped electrodes 122B and 122C, and are not electrically connected to the block-shaped electrode 132B between the ring-shaped electrodes 122B and 122C.

According to another aspect, the second block-shaped electrodes 136A that are arranged from the center C toward a direction away from the center C and the ring-shaped electrodes 122A to 122F of the first touch electrode 120 are arranged in a staggered manner, and the second block-shaped electrodes 136A may be electrically connected to each other through bridge electrodes 140, so as to form a second electrode string 138A. In addition, in the second electrode string 138A, there is only one second block-shaped electrode 136A between adjacent two of the ring-shaped electrodes 122A to 122F. Likewise, the second block-shaped electrodes 136B that are arranged from the center C toward a direction away from the center C are also electrically connected to each other through bridge electrodes 140 to form another second electrode string 138B, and the second electrode strings 138A and 138B are electrically isolated from each other. Details are not described herein again.

The first electrode string 134A and the second electrode string 138A may be electrically connected and form a first sensing electrode string 139A, which, for example, may achieve an electrical connection by using bridge electrodes. In the first sensing electrode string 139A, a quantity of first block-shaped electrodes 132A of the first electrode string 134A and a quantity of second block-shaped electrodes 136A of the second electrode string 138A are the same. Likewise, the first electrode string 134B and the second electrode string 138B are electrically connected and form a second sensing electrode string 139B. In the second sensing electrode string 134B, a quantity of first block-shaped electrodes 132B of the first electrode string 134B and a quantity of second block-shaped electrodes 136B of the second electrode string 138B are the same. In addition, the first sensing electrode string 139A and the second sensing electrode string 139B may be electrically insulated from each other by means of isolation portions 108. In the foregoing configuration manner, the block-shaped electrodes of the second touch electrode 130 may form a plurality of sensing electrode strings.

In a single sensing electrode string, an included angle between extending directions of two electrode strings that are electrically connected to each other approximately approaches a straight angle. Specifically, the first block-shaped electrodes 132A forming the first electrode string 134A arranged from the center C along a first direction D1, and the second block-shaped electrodes 136A forming the second electrode string 138A are arranged from the center C along a second direction D2. An included angle between the first direction D1 and the second direction D2 may substantially be an angle θ1, and the angle θ1 approximately approaches 180°.

Referring to FIG. 1A again, to prevent the drawing from being excessively complex, FIG. 1A does not show the bridge electrodes 140. Each sensing electrode string of the second touch electrode 130 may be connected to the control unit 104 through a wire 106, so as to electrically connect each sensing electrode string to the control unit 104. Specifically, in this implementation, a wire 106 is separately connected to each second block-shaped electrode 136 on the outermost side, and is not connected to a first block-shaped electrode 132. Besides, in other implementations, distribution positions of the first block-shaped electrodes 132 and the second block-shaped electrodes 136 may be exchanged, and a wire 106 may be separately connected to each first block-shaped electrode 132 on the outermost side, and is not connected to a second block-shaped electrode 136.

Each second block-shaped electrode 136 has a first opening 137. Although the first opening 137 drawn in FIG. 1A is a rectangle, the first opening 137 may be in another shape, for example, a triangle, a pentagon, a circle, an ellipse, or another appropriate shape. Because each second block-shaped electrode 136 has a first opening 137, an area of each second block-shaped electrode 136 is smaller than an area of each first block-shaped electrode 132. That is, if an area of each first block-shaped electrode 132 is represented by A1, and an area of each second block-shaped electrode 136 is represented by A2, A1>A2.

In the touch control principle, for capacitance generated by interaction between respective block-shaped electrodes and the ring-shaped electrodes 122A to 122F, values of the generated capacitance are positively correlated to areas of the first block-shaped electrodes 132 and the second block-shaped electrodes 136, and further, the two are in an approximately directly proportional relationship. In addition, because areas of the first block-shaped electrodes 132 and the second block-shaped electrodes 136 are different, the values of the capacitance respectively generated between the first block-shaped electrodes 132 and the ring-shaped electrodes 122A to 122F and between the second block-shaped electrodes 136 and the ring-shaped electrodes 122A to 122F are also different.

For example, because areas of the first block-shaped electrodes 132 are larger than areas of the second block-shaped electrodes 136, values of capacitance generated between the first block-shaped electrodes 132 and the ring-shaped electrodes 122A to 122F are greater than values of capacitance generated between the second block-shaped electrodes 136 and the ring-shaped electrodes 122A to 122F. Therefore, although each sensing electrode string formed of the first block-shaped electrodes 132 and the second block-shaped electrodes 136 is separately connected to the control unit 104 through a single wire 106, because areas of the first block-shaped electrodes 132 and second block-shaped electrodes 136 of each sensing electrode string are different, capacitance values generated between the first block-shaped electrodes 132 and the ring-shaped electrodes 122A to 122F and between the second block-shaped electrodes 136 and the ring-shaped electrodes 122A to 122F are different, where the first block-shaped electrodes 132 and the second block-shaped electrodes 136 belong to a same sensing electrode string, so that the control unit 104 can distinguish whether a position of a touch object is close to a first block-shaped electrode 132 or a second block-shaped electrode 136.

Specifically, the ring-shaped electrodes 122A to 122F of the first touch electrode 120 may serve as transmit electrodes (Tx), and a sensing electrode string formed of block-shaped electrodes of the second touch electrode 130 may serve as a receive electrode (Rx). When a touch object approaches the touch panel 100A, the ring-shaped electrodes 122A to 122F may be used for detecting diameter coordinates of the touch object relative to the center C on the touch panel 100A, and the sensing electrode string may be used to detect polar angle coordinates of the touch object relative to the center C on the touch panel 100A. Subsequently, the control unit 104 may calculate a position of the touch object by using the received diameter coordinates and polar angle coordinates.

By means of the foregoing configuration, the control unit 104 can complete recognition on a touch operation when the wires 106 are merely connected to the second block-shaped electrodes 136. In other words, wires connected to the first block-shaped electrodes 132 can be omitted, by means of which a quantity of wires used on the touch panel 100A can be reduced, so that spatial configuration of the touch panel 100A can be more flexible. According to another aspect, because wires connected to the first block-shaped electrodes 132 are omitted, disposition positions of the first block-shaped electrodes 132 of the second touch electrode 130 can be closer to an edge of the first region Z1 of the substrate 102, so that the touch panel 100A can be designed into a narrow-bezel style.

Figure 2:
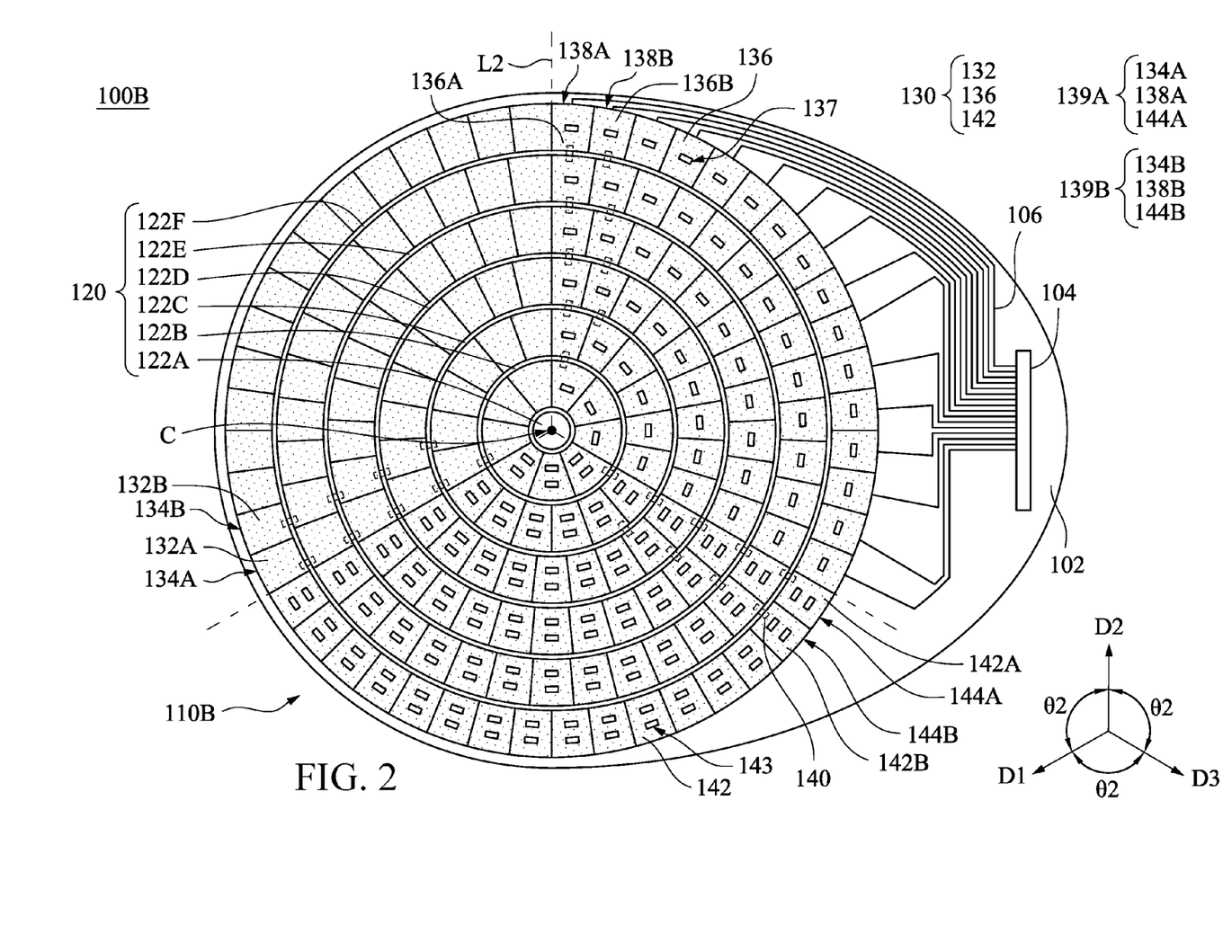
FIG. 2 is a top view of a touch panel according to a second implementation of the present invention.

Referring to FIG. 2, FIG. 2 is a top view of a touch panel 100B according to a second implementation of the present invention. This implementation differs from the first implementation at least in that: in a touch structure 110B of this implementation, the second touch electrode 130 further includes a plurality of third block-shaped electrodes 142. In addition, to prevent the drawing from being excessively complex, FIG. 2 only shows some of the bridge electrodes 140, which is clearly stated first.

As shown in FIG. 2, the first block-shaped electrodes 132, the second block-shaped electrodes 136, and the third block-shaped electrodes 142 are radially arranged outward from the center C, and the first block-shaped electrodes 132, the second block-shaped electrodes 136, and the third block-shaped electrodes 142 may also form a plurality of ring-shaped patterns sharing the center C. In addition, because a quantity of the first block-shaped electrodes 132, a quantity of the second block-shaped electrodes 136, and a quantity of the third block-shaped electrodes 142 are the same, the first block-shaped electrodes 132, the second block-shaped electrodes 136, and the third block-shaped electrodes 142 respectively occupy one thirds of the second touch electrodes 130. For example, in FIG. 2, the second touch electrode 130 is divided by dashed lines L2 into three equal regions. The first block-shaped electrode 132, the second block-shaped electrode 136, and the third block-shaped electrodes 142 are respectively located inside the three regions.

Likewise, in each ring-shaped pattern, shapes and contours of the first block-shaped electrode 132, the second block-shaped electrode 136, and the third block-shaped electrode 142 are the same. That is, an area defined by a counter of a vertical projection of each first block-shaped electrode 132 on the substrate 102, an area defined by a contour of a vertical projection of each second block-shaped electrode 136 on the substrate 102, and an area defined by a contour of a vertical projection of each third block-shaped electrode 142 on the substrate 102 are substantially the same.

Similar to the first implementation, the third block-shaped electrodes 142 may form a plurality of electrode strings. As shown in FIG. 2, third block-shaped electrodes 142A that are arranged from the center C toward a direction away from the center C and the ring-shaped electrodes 122A to 122F of the first touch electrode 120 are arranged in a staggered manner, and the third block-shaped electrodes 142A may be electrically connected to each other through bridge electrodes 140, so as to form a third electrode string 144A. Moreover, third block-shaped electrodes 142B may also be electrically connected to each other through bridge electrodes 140, so as to form another third electrode string 144B.

In this implementation, the first electrode string 134A, the second electrode string 138A, and the third electrode string 144A are electrically connected to each other and form a first sensing electrode string 139A. In the first sensing electrode string 139A, a quantity of first block-shaped electrodes 132A, a quantity of second block-shaped electrodes 136A, and a quantity of third block-shaped electrodes 142A are the same. Likewise, the first electrode string 134B, the second electrode string 138B, and the third electrode string 144B are electrically connected to each other and form a second sensing electrode string 139B. In the second sensing electrode string 139B, a quantity of first block-shaped electrodes 132B, a quantity of second block-shaped electrodes 136B, and a quantity of third block-shaped electrodes 142B are the same. In addition, the first sensing electrode string 139A and the second sensing electrode string 139B are electrically insulated from each other In a single sensing electrode string, an included angle between extending directions of electrode strings that are electrically connected to each other approximately approaches 120°. Specifically, the first block-shaped electrodes 132A forming the first electrode string 134A are arranged from the center C along a first direction D1, the second block-shaped electrodes 136 forming the second electrode string 138A are arranged from the center C along a second direction D2, and the third block-shaped electrodes 142A forming the third electrode string 144A are arranged from the center C along a third direction D3. An included angle between the first direction D1 and the second direction D2, an included angle between the second direction D2 and the third direction D3, and an included angle between the third direction D3 and the first direction D1 may substantially be a same angle θ2, and the angle θ2 approximately approaches 120°.

Each third block-shaped electrode 142 has two second openings 143, and a total area of the two second openings 143 is larger than an area of a single first opening 137 of the second block-shaped electrode 136, so that an area of each third block-shaped electrode 142 is smaller than an area of each second block-shaped electrode 136. That is, if an area of each first block-shaped electrode 132 is represented by A1, an area of each second block-shaped electrode 136 is represented by A2, and an area of each third block-shaped electrode 142 is represented by A3, A1>A2>A3.

By means of the foregoing configuration, the control unit 104 can complete recognition on a touch operation when the wires 106 are merely connected to the second block-shaped electrodes 136. In other words, wires connected to the first block-shaped electrodes 132 and the third block-shaped electrodes 142 can be omitted, by means of which a quantity of wires used on the touch panel 100B can be reduced, which is beneficial to designing the touch panel 100B into a narrow-bezel style.

Figure 3:
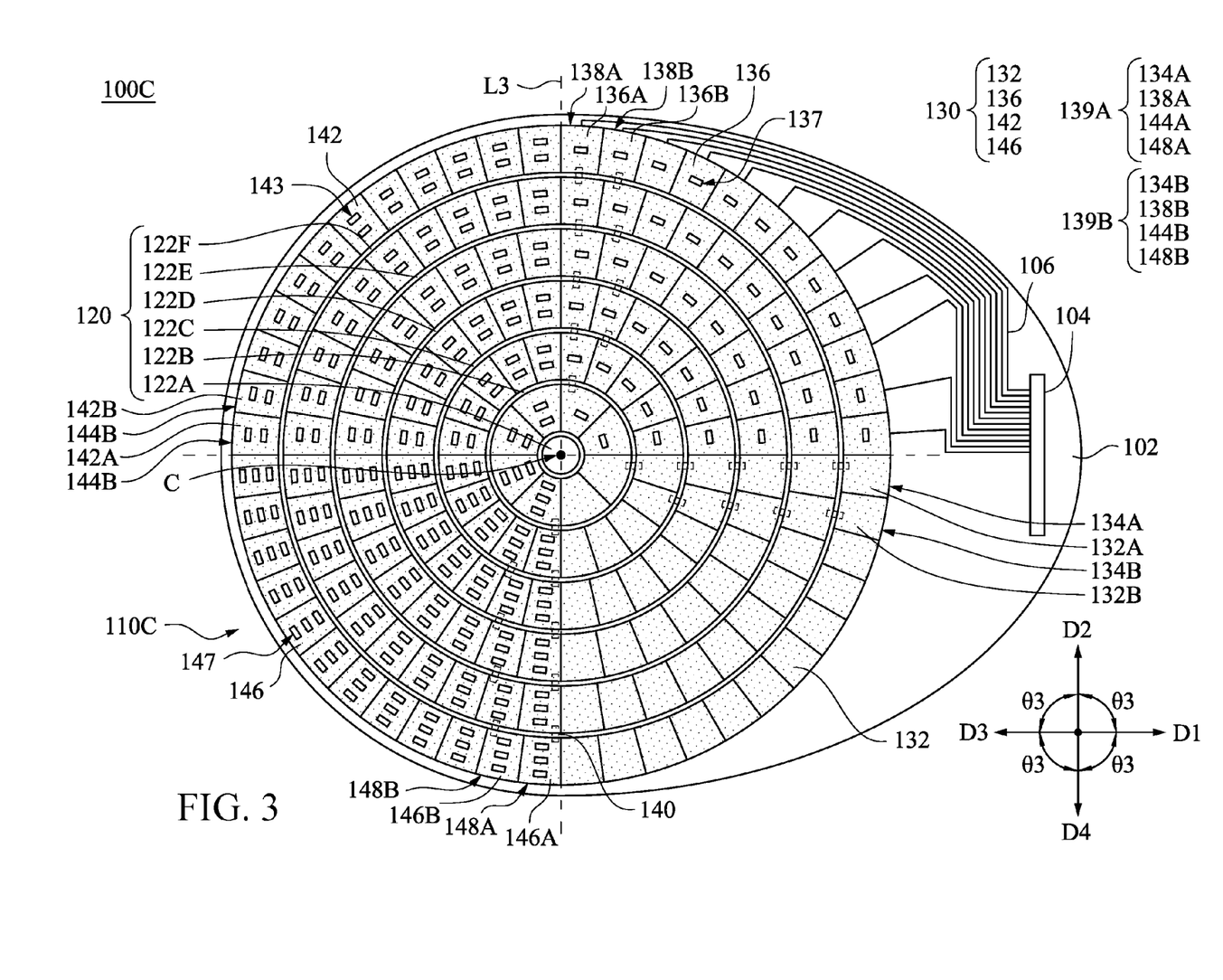
FIG. 3 is a top view of a touch panel according to a third implementation of the present invention.

Referring to FIG. 3, FIG. 3 is a top view of a touch panel 100C according to a third implementation of the present invention. This implementation differs from the first implementation at least in that: in a touch structure 110C of this implementation, the second touch electrode 130 further includes a plurality of fourth block-shaped electrodes 146. In addition, to prevent the drawing from being excessively complex, FIG. 3 only shows some of the bridge electrodes 140, which is clearly stated first.

As shown in FIG. 3, the first block-shaped electrodes 132, the second block-shaped electrodes 136, the third block-shaped electrodes 142, and the fourth block-shaped electrodes 146 are radially arranged outward from the center C, and the first block-shaped electrodes 132, the second block-shaped electrodes 136, the third block-shaped electrodes 142, and the fourth block-shaped electrodes 146 may also form a plurality of ring-shaped patterns sharing the center C. In addition, because a quantity of the first block-shaped electrodes 132, a quantity of the second block-shaped electrodes 136, a quantity of the third block-shaped electrodes 142, and a quantity of the fourth block-shaped electrodes 146 are the same, the first block-shaped electrodes 132, the second block-shaped electrodes 136, the third block-shaped electrodes 142, and the fourth block-shaped electrodes 146 respectively occupy one fourths of the second touch electrodes 130. For example, in FIG. 2, the second touch electrode 130 is divided by dashed lines L3 into four equal regions. The first block-shaped electrode 132, the second block-shaped electrode 136, the third block-shaped electrodes 142, and the fourth block-shaped electrodes 146 are respectively located inside the four regions.

Likewise, in each ring-shaped pattern, shapes and contours of the first block-shaped electrode 132, the second block-shaped electrode 136, the third block-shaped electrode 142, and the fourth block-shaped electrode 146 are the same. That is, an area defined by a counter of a vertical projection of each first block-shaped electrode 132 on the substrate 102, an area defined by a contour of a vertical projection of each second block-shaped electrode 136 on the substrate 102, an area defined by a contour of a vertical projection of each third block-shaped electrode 142 on the substrate 102, and an area defined by a contour of a vertical projection of each fourth block-shaped electrode 146 on the substrate 102 are substantially the same.

Similar to the first implementation, the fourth block-shaped electrodes 146 may form a plurality of electrode strings. As shown in FIG. 3, fourth block-shaped electrodes 146A that are arranged from the center C toward a direction away from the center C and the ring-shaped electrodes 122A to 122F of the first touch electrode 120 are arranged in a staggered manner, and the fourth block-shaped electrodes 146A may be electrically connected to each other through bridge electrodes 140, so as to form a fourth electrode string 148A. Moreover, fourth block-shaped electrodes 146B may also be electrically connected to each other through bridge electrodes 140, so as to form another fourth electrode string 148B.

In this implementation, the first electrode string 134A, the second electrode string 138A, the third electrode string 144A, and the fourth electrode string 148A are electrically connected to each other and form a first sensing electrode string 139A. In the first sensing electrode string 139A, a quantity of first block-shaped electrodes 132A, a quantity of second block-shaped electrodes 136A, a quantity of third block-shaped electrodes 142A, and a quantity of fourth block-shaped electrodes 146A are the same. In this implementation, the first electrode string 134B, the second electrode string 138B, the third electrode string 144B, and the fourth electrode string 148B are electrically connected to each other and form a second sensing electrode string 139B. In the second sensing electrode string 139B, a quantity of first block-shaped electrodes 132B, a quantity of second block-shaped electrodes 136B, a quantity of third block-shaped electrodes 142B, and a quantity of fourth block-shaped electrodes 146B are the same. In addition, the first sensing electrode string 139A and the second sensing electrode string 139B are electrically insulated from each other In a single sensing electrode string, an included angle between extending directions of electrode strings that are electrically connected to each other approximately approaches 90°. Specifically, the first block-shaped electrodes 132A forming the first electrode string 134A are arranged from the center C along a first direction D1, the second block-shaped electrodes 136 forming the second electrode string 138A are arranged from the center C along a second direction D2, the third block-shaped electrodes 142A forming the third electrode string 144A are arranged from the center C along a third direction D3, and the fourth block-shaped electrodes 146A forming the fourth electrode string 148A are arranged from the center C along a third direction D4. An included angle between the first direction D1 and the second direction D2, an included angle between the second direction D2 and the third direction D3, an included angle between the third direction D3 and the fourth direction D4, and an included angle between the fourth direction D4 and the first direction D1 may substantially be a same angle θ3, and the angle θ3 approximately approaches 90°.

Each fourth block-shaped electrode 146 has three third openings 147, and a total area of the three third openings 147 is larger than a total area of two second openings 143, so that an area of each fourth block-shaped electrode 146 is smaller than an area of each third block-shaped electrode 142. That is, if an area of each first block-shaped electrode 132 is represented by A1, an area of each second block-shaped electrode 136 is represented by A2, an area of each third block-shaped electrode 142 is represented by A3, and an area of each fourth block-shaped electrode 146 is represented by A4, A1>A2>A3>A4.

By means of the foregoing configuration, the control unit 104 can complete recognition on a touch operation when the wires 106 are merely connected to the second block-shaped electrodes 136. In other words, wires connected to the first block-shaped electrodes 132, the third block-shaped electrodes 142, and the fourth block-shaped electrodes 146 can be omitted, by means of which a quantity of wires used on the touch panel 100C can be reduced, which is beneficial to designing the touch panel 100C into a narrow-bezel style.

Figure 4:
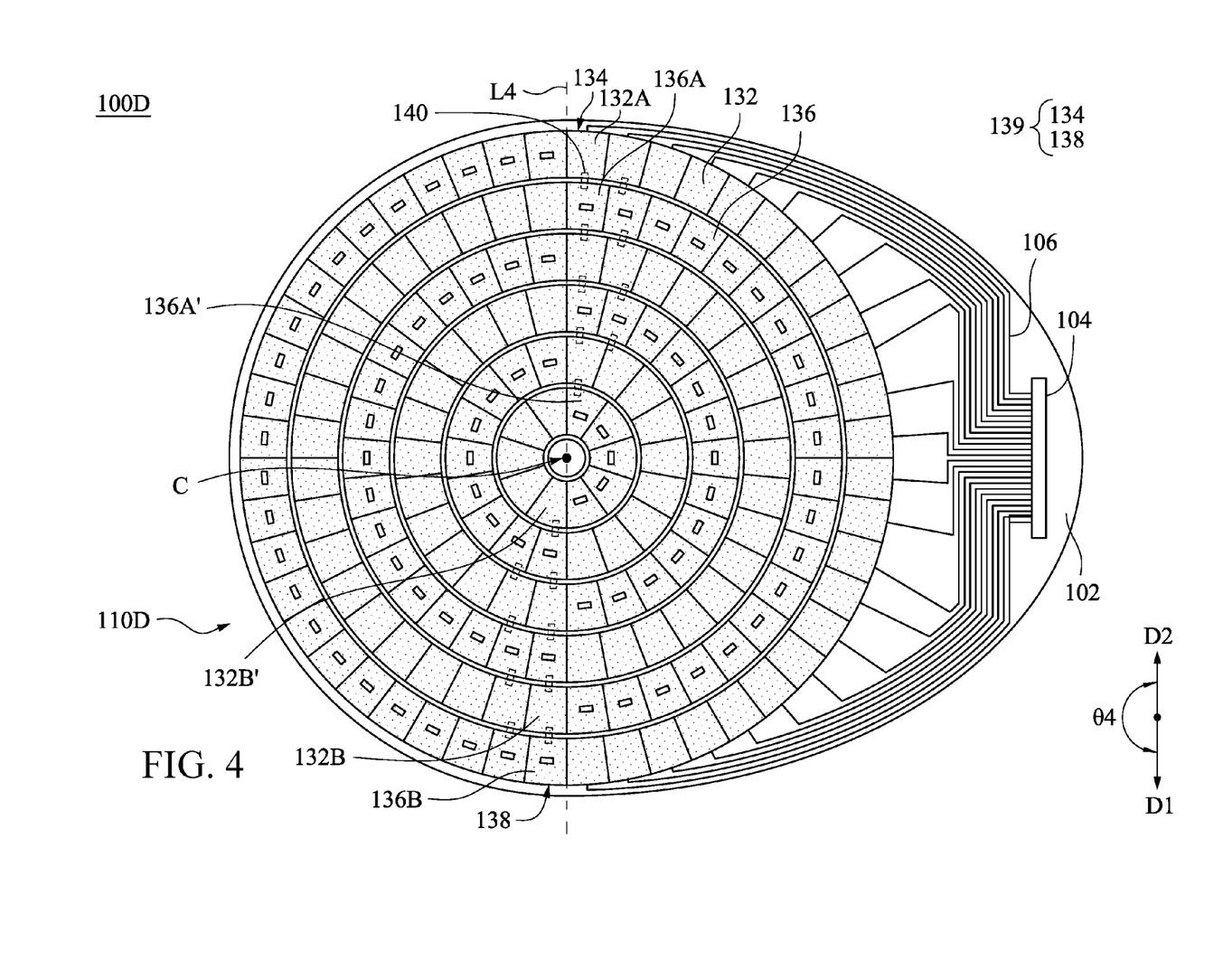
FIG. 4 is a top view of a touch panel according to a fourth implementation of the present invention.

Referring to FIG. 4, FIG. 4 is a top view of a touch panel 100D according to a fourth implementation of the present invention. This implementation differs from the first implementation at least in that: distribution positions of first block-shaped electrodes 132 and second block-shaped electrodes 136 of a second touch electrode 130 in a touch structure 110D of this implementation are respectively different from distribution positions of first block-shaped electrodes 132 and second block-shaped electrodes 136 in the first implementation. In this implementation, an area relationship and a quantity relationship between the first block-shaped electrodes 132 and the second block-shaped electrodes 136 and a relationship between areas defined by counters of vertical projections of the block-shaped electrodes 132 and the second block-shaped electrodes 136 are similar to those in the first implementation, and details are not described herein again. In addition, to prevent the drawing from being excessively complex, FIG. 4 only shows some of the bridge electrodes 140, which is clearly stated first.

In this implementation, the first block-shaped electrodes 132 may be grouped into a first group and a second group, and the second block-shaped electrodes 136 may be grouped into a third group and a fourth group. First block-shaped electrodes 132 belonging to the first group and second block-shaped electrodes 136 belonging to the third group are located on the right side of a dashed line L4, and the first block-shaped electrodes 132 belonging to the first group and the second block-shaped electrodes 136 belonging to the third group are arranged in a staggered manner from the center C toward a direction away from the center C, and are electrically connected through bridge electrodes 140. First block-shaped electrodes 132 belonging to the second group and second block-shaped electrodes 136 belonging to the fourth group are located on the left side of the dashed line L4, and the first block-shaped electrodes 132 belonging to the second group and the second block-shaped electrodes 136 belonging to the fourth group are arranged in a staggered manner from the center C toward a direction away from the center C, and are electrically connected through bridge electrodes 140.

First block-shaped electrodes 132A belonging to the first group and second block-shaped electrodes 136A belonging to the third group may form a first electrode string 134 by means of bridge electrodes 140, and the first electrode string 134A uses a second block-shaped electrode 136A' belonging to the third group as a starting point for arrangement from the center C. Likewise, first block-shaped electrodes 132B belonging to the second group and second block-shaped electrodes 136B belonging to the fourth group may form a second electrode string 138 by means of bridge electrodes 140, and the second electrode string 138 uses a first block-shaped electrode 132B' belonging to the second group as a starting point for arrangement from the center C.

Similar to the first implementation, the first electrode string 134 and the second electrode string 138 may be electrically connected, and form a sensing electrode string 139, and in the sensing electrode string 139, an included angle of extending directions of electrode strings that are electrically connected to each other approximately approaches a straight angle. Specifically, the first block-shaped electrodes 132A belonging to the first group and the second block-shaped electrodes 136A belonging to the third group are arranged from the center C along a first direction D1, and the first block-shaped electrodes 132B belonging to the second group and the second block-shaped electrodes 136B belonging to the fourth group are arranged from the center C along a second direction D2. An included angle between the first direction D1 and the second direction D2 may substantially be an angle θ4, and the angle θ4 approximately approaches 180°.

By means of the foregoing configuration, because the first block-shaped electrodes 132 on two sides, namely, the left and right sides, of the dashed line L4 are asymmetrically distributed, and the second block-shaped electrodes 136 on two sides, namely, the left and right sides, of the dashed line L4 are also asymmetrically distributed, the control unit 104 still can detect polar angle coordinates of a touch object relative to the center C on the touch panel 100D by means of sensing electrode strings formed of block-shaped electrodes. In addition, wires 106 are respectively connected to respective first block-shaped electrodes 132 located on the outermost side of a ring-shaped pattern on the right side of the dashed line L4, and are not connected to respective second block-shaped electrodes 136 located on the outermost side of a ring-shaped pattern on the left side of the dashed line L4.

By means of the foregoing configuration, the control unit 104 can complete recognition on a touch operation when wires are merely connected to respective first block-shaped electrodes 132 located on the outermost side of a ring-shaped pattern on the right side of the dashed line L4. In other words, wires connected to the respective second block-shaped electrodes 136 located on the outermost side of a ring-shaped pattern on the left side of the dashed line L4 can be omitted, by means of which a quantity of wires used on the touch panel 100D can be reduced, which is beneficial to designing the touch panel 100D into a narrow-bezel style.

In view of the above, the touch panel of the present invention includes a touch structure, a control unit, and a plurality of wires. The touch structure includes ring-shaped electrodes and block-shaped electrodes. The ring-shaped electrodes and the block-shaped electrodes may be arranged in a staggered manner, and the block-shaped electrodes may form a sensing electrode string by means of bridge electrodes. The block-shaped electrodes may be classified into first block-shaped electrodes and second block-shaped electrodes. An area of a first block-shaped electrode is larger than an area of a second block-shaped electrode. Because areas of the first block-shaped electrode and the second block-shaped electrode are different, values of capacitance respectively generated between the first block-shaped electrode and the ring-shaped electrodes and between the second block-shaped electrode and the ring-shaped electrodes are different. Therefore, the control unit can complete recognition on a touch operation when wires are merely connected to second block-shaped electrodes. In other words, wires connected to the first block-shaped electrodes can be omitted, by means of which a quantity of wires used on the touch panel can be reduced, so that the touch panel can be designed into a narrow-bezel style.

Although the present invention is disclosed as above using various implementations, the implementations are not intended to limit the present invention. Any person skilled in the art may make various variations or modifications without departing from the spirit and scope of the present invention. Therefore, the protection scope of the present invention shall be subject to the protection scope of the appended claims.

What is claimed is:

1. A touch structure, comprising:
   a first touch electrode, disposed on a substrate and comprising a plurality of ring-shaped electrodes, wherein the ring-shaped electrodes are concentrically arranged around a center; and
   a second touch electrode, disposed on the substrate and electrically insulated from the first touch electrode, wherein the second touch electrode comprises a plurality of first block-shaped electrodes and a plurality of second block-shaped electrodes, an area of each of the first block-shaped electrodes is A1, an area of each of the second block-shaped electrodes is A2, and A1>A2, wherein the first block-shaped electrodes are arranged from the center toward a direction away from the center and are electrically connected to each other, so as to form a first electrode string, the second block-shaped electrodes are arranged from the center toward a direction away from the center and are electrically connected to each other, so as to form a second electrode string, each of the second block-shaped electrodes forming the second electrode string has at least one first opening, and the first electrode string and the second electrode string are electrically connected.

2. The touch structure according to claim 1, wherein the first block-shaped electrodes forming the first electrode string are arranged from the center along a first direction, and the second block-shaped electrodes forming the second electrode string are arranged from the center along a second direction, wherein an included angle between the first direction and the second direction is substantially a straight angle.

3. The touch structure according to claim 1, wherein a quantity of the first block-shaped electrodes forming the first electrode string and a quantity of the second block-shaped electrodes forming the second electrode string are the same, and an area defined by a contour of a vertical projection of each of the first block-shaped electrodes on the substrate and an area defined by a contour of a vertical projection of each of the second block-shaped electrodes on the substrate are substantially the same.

4. The touch structure according to claim 1, wherein the first block-shaped electrodes forming the first electrode string and the ring-shaped electrodes are arranged in a staggered manner, and the second block-shaped electrodes forming the second electrode string and the ring-shaped electrodes are arranged in a staggered manner.

5. The touch structure according to claim 1, wherein the second touch electrode further comprises a plurality of third block-shaped electrodes, an area of each of the third block-shaped electrodes is A3, wherein A1≠A3 and A2≠A3, and the third block-shaped electrodes are arranged from the center toward a direction away from the center and are electrically connected to each other, so as to form a third electrode string, wherein the first electrode string, the second electrode string, and the third electrode string are electrically connected.

6. The touch structure according to claim 5, wherein the first block-shaped electrodes forming the first electrode string are arranged from the center along a first direction, the second block-shaped electrodes forming the second electrode string are arranged from the center along a second direction, and the third block-shaped electrodes forming the third electrode string are arranged from the center along a third direction, wherein an included angle between the first direction and the second direction, an included angle between the second direction and the third direction, and an included angle between the third direction and the first direction are substantially the same.

7. The touch structure according to claim 5, wherein a quantity of the first block-shaped electrodes forming the first electrode string, a quantity of the second block-shaped electrodes forming the second electrode string, and a quantity of the third block-shaped electrodes forming the third electrode string are the same, and an area defined by a contour of a vertical projection of each of the first block-shaped electrodes on the substrate, an area defined by a contour of a vertical projection of each of the second block-shaped electrodes on the substrate, and an area defined by a contour of a vertical projection of each of the third block-shaped electrodes on the substrate are substantially the same.

8. The touch structure according to claim 5, wherein each of the third block-shaped electrodes forming the third electrode string has at least one second opening, and A1>A2>A3.

9. The touch structure according to claim 5, wherein the second touch electrode further comprises a plurality of fourth block-shaped electrodes, an area of each of the fourth block-shaped electrodes is A4, wherein A1≠A4, A2≠A4, and A3≠A4, and the fourth block-shaped electrodes are arranged from the center toward a direction away from the center and are electrically connected to each other, so as to form a fourth electrode string, wherein the first electrode string, the second electrode string, the third electrode string, and the fourth electrode string are electrically connected.

10. The touch structure according to claim 9, wherein the first block-shaped electrodes forming the first electrode string are arranged from the center along a first direction, the second block-shaped electrodes forming the second electrode string are arranged from the center along a second direction, the third block-shaped electrodes forming the third electrode string are arranged from the center along a third direction, and the fourth block-shaped electrodes forming the fourth electrode string are arranged from the center along a fourth direction, wherein an included angle between the first direction and the second direction, an included angle between the second direction and the third direction, an included angle between the third direction and the fourth direction, and an included angle between the fourth direction and the first direction are substantially the same.

11. The touch structure according to claim 9, wherein a quantity of the first block-shaped electrodes forming the first electrode string, a quantity of the second block-shaped electrodes forming the second electrode string, a quantity of the third block-shaped electrodes forming the third electrode string, and a quantity of the fourth block-shaped electrodes forming the fourth electrode string are the same, and an area defined by a contour of a vertical projection of each of the first block-shaped electrodes on the substrate, an area defined by a contour of a vertical projection of each of the second block-shaped electrodes on the substrate, an area defined by a contour of a vertical projection of each of the third block-shaped electrodes on the substrate, and an area defined by a contour of a vertical projection of each of the fourth block-shaped electrodes on the substrate are substantially the same.

12. The touch structure according to claim 9, wherein each of the third block-shaped electrodes forming the third electrode string has at least one second opening, each of the fourth block-shaped electrodes forming the fourth electrode string has at least one third opening, and A1>A2>A3>A4.

13. The touch structure according to claim 1, wherein the ring-shaped electrodes are equidistantly arranged from the center toward a direction away from the center.

14. A touch structure, comprising:
a first touch electrode, disposed on a substrate and comprising a plurality of ring-shaped electrodes, wherein the ring-shaped electrodes share a center and are radially spread from the center; and
a second touch electrode, disposed on the substrate and electrically insulated from the first touch electrode, wherein the second touch electrode comprises a plurality of first block-shaped electrodes and a plurality of second block-shaped electrodes, an area of each of the first block-shaped electrodes is A1, an area of each of the second block-shaped electrodes is A2, and A1>A2, wherein the first block-shaped electrodes are grouped into a first group and a second group, the second block-shaped electrodes are grouped into a third group and a fourth group, the first block-shaped electrodes belonging to the first group and the second block-shaped electrodes belonging to the third group are arranged in a staggered manner from the center toward a direction away from the center and are electrically connected to each other, so as to form a first electrode string, and the first electrode string uses one of the second block-shaped electrodes belonging to the third group as a starting point for arrangement from the center, and the first block-shaped electrodes belonging to the second group and the second block-shaped electrodes belonging to the fourth group are arranged in a staggered manner from the center toward a direction away from the center and are electrically connected to each other, so as to form a second electrode string, each of the second block-shaped electrodes has at least one first opening, and the second electrode string uses one of the first block-shaped electrodes belonging to the second group as a starting point for arrangement from the center, wherein the first electrode string and the second electrode string are electrically connected.

15. The touch structure according to claim 14, wherein the first block-shaped electrodes belonging to the first group and the second block-shaped electrodes belonging to the third group are arranged from the center along a first direction, and the first block-shaped electrodes belonging to the second group and the second block-shaped electrodes belonging to the fourth group are arranged from the center along a second direction, wherein an included angle between the first direction and the second direction is substantially a straight angle.

16. The touch structure according to claim 14, wherein a quantity of the first block-shaped electrodes belonging to the first group, a quantity of the first block-shaped electrodes belonging to the second group, a quantity of the second block-shaped electrodes belonging to the third group, and a quantity of the second block-shaped electrodes belonging to the fourth group are the same, and an area defined by a contour of a vertical projection of each of the first block-shaped electrodes on the substrate and an area defined by a contour of a vertical projection of each of the second block-shaped electrodes on the substrate are substantially the same.

17. The touch structure according to claim 14, wherein the ring-shaped electrodes and the first block-shaped electrodes belonging to the first group, the first block-shaped electrodes belonging to the second group, the second block-shaped electrodes belonging to the third group, and the second block-shaped electrodes belonging to the fourth group are arranged in a staggered manner.

18. A touch panel, comprising:
a substrate, distinguished into a first region and a second region that are connected to each other, wherein an area of the first region is larger than an area of the second region;
the touch structure according to claim 1, disposed on the first region and the second region of the substrate;
a control unit, disposed on the first region of the substrate; and
a plurality of wires, disposed on the substrate and configured to electrically connect the second touch electrodes of the touch structure and the control unit, wherein vertical projections of the wires on the substrate are located inside the first region.

* * * * *